United States Patent [19]

Wayne

[11] Patent Number: 5,129,296
[45] Date of Patent: Jul. 14, 1992

[54] NON-DESTRUCTIVE COMPOSITE MATERIAL SAW BLADE AND METHOD OF USING SAME

[75] Inventor: Bales F. Wayne, Goldsboro, N.C.

[73] Assignee: Georgia-Pacific Corporation, Atlanta, Ga.

[21] Appl. No.: 709,662

[22] Filed: Jun. 7, 1991

Related U.S. Application Data

[63] Continuation-in-part of Ser. No. 540,769, Jun. 20, 1990, abandoned.

[51] Int. Cl.$^5$ .............................. B27B 33/08
[52] U.S. Cl. ............................ 83/19; 83/676; 83/835; 30/347; 144/218
[58] Field of Search ............. 83/676, 834, 835, 839, 83/848, 854, 855, 13, 19; 144/218; 30/347

[56] References Cited

U.S. PATENT DOCUMENTS

| | | | |
|---|---|---|---|
| 2,528,226 | 10/1950 | Hildebrant | 83/854 |
| 2,850,056 | 9/1958 | Kehl | 83/848 |
| 2,903,782 | 9/1959 | Cowley | 83/676 |
| 3,308,703 | 3/1967 | Sauer | 83/854 X |
| 3,521,684 | 7/1970 | McRobert et al. | 83/837 |
| 3,730,038 | 5/1973 | Farb | 83/854 X |
| 3,798,767 | 3/1974 | Rizer et al. | 83/676 X |
| 3,838,722 | 10/1974 | Downing | 144/118 |
| 3,866,504 | 2/1975 | Claesson et al. | 83/852 |
| 3,901,295 | 8/1975 | Downing | 144/118 |
| 4,368,610 | 1/1983 | Aono | 30/347 |
| 4,382,397 | 5/1983 | De Torre | 83/676 X |
| 4,515,055 | 5/1985 | Scott | 83/835 |
| 4,551,918 | 11/1985 | Smithberg | 30/347 |
| 4,765,217 | 8/1988 | Ludwig | 83/841 |
| 4,766,794 | 8/1988 | Blake | 83/848 X |
| 4,867,025 | 9/1989 | Eklöf et al. | 83/835 |

FOREIGN PATENT DOCUMENTS

| | | | |
|---|---|---|---|
| 720678 | 11/1965 | Canada | 83/835 |
| 3346603 | 7/1984 | Fed. Rep. of Germany | 83/835 |

OTHER PUBLICATIONS

Kruykov, N. I., "Dividing Wood-Based Sheet Materials With Rotating Disk," *Lesnoi Zhurnal*, 1976 (No. 6), pp. 109-115.

Glebovv, I. F. and Kucherov, I. K., "Cutting Force In Rotary Cutting Of Hot-Pressed Sheets" [made of chips without binders], *Lesnoi Journal*, 1972 (No. 4), pp. 102-107.

*Primary Examiner*—Hien H. Phan
*Assistant Examiner*—Raymond D. Woods
*Attorney, Agent, or Firm*—Banner, Birch, McKie & Beckett

[57] ABSTRACT

The saw blade has a series of teeth which are formed with cutting elements which are spaced inwardly from an outer circumferential edge and have sides which extend outwardly from planar sides of the saw blade. The saw blade is designed to cut yieldable material without cutting the carrier medium which can be a conveyor belt or a caul. Cutting is achieved by pushing the blade into the yieldable material until a cutting element engages the material. Movement of the blade then causes the cutting element to cut the yieldable material until a full depth cut is accomplished. The conveyor belt or caul is not cut by the saw blade outer edge which acts like a smooth disk. The saw blade can include a wear strip positioned on the outer circumferential rim to lengthen the life of the saw blade and conveyor belt or caul.

24 Claims, 3 Drawing Sheets

NON-DESTRUCTIVE COMPOSITE MATERIAL SAW BLADE AND METHOD OF USING SAME

This application is a continuation-in-part of application Ser. No. 07/540,769 filed Jun. 20, 1990 entitled "Non-Destructive Composite Material Saw Blade", now abandoned.

BACKGROUND OF THE INVENTION

The present invention relates to cutting implements, and more particularly to saw blades for a yieldable material.

Previously, when it was desired to cut a composite material such as a loose mat of oriented strand board in the uncured state it was conventional to use a rotating circular saw blade of conventional design. Oriented strand board is formed of elongated wood particles or chips and one or more binder ingredients. The mat while being loose in the uncured state is stiff and retains its shape while supported on a flat surface. Conventional saw blades have teeth extending outwardly from an outer circumferential rim of the saw blade. These teeth are formed with an outwardly extending cutting element that is designed to engage the material to be cut. When the conventional saw blade cuts through the full thickness of the loose mat, the blade will then cut into the surface of the carrier medium because there is no means of preventing the cutting surfaces on the teeth from engaging the carrier medium. As a result, the surface of the carrier medium such as the screen, belt or caul that carries the loose mat is damaged.

There have been several attempts in the past to design a blade for cutting yieldable materials such as fabric or uncured rubber. These prior art cutting blades are designed for very specific purposes and are structurally and operationally quite different from the present invention. None would be useful for cutting composite material such as oriented strand board. One such example of a prior art blade is shown in Rizer et al., U.S. Pat. No. 3,798,767 which is directed to a device for cutting flexible material such as carpet. In the device of Rizer et al. a blade 35 is provided having spaced semicircular shaped teeth with a smooth outer surface. The root portion 30 of the teeth have an inner surface 37 which is sharpened to act as the cutting surface with a cutting edge. Fabric such as carpet is pushed into the cutting blade and is sandwiched between the cutting blade 27 and block 15. As the device is advanced, material is pushed into the area between block 15 and the blade 37 by the outer surface 36 of the teeth 28. The material is then cut by the surface 37 and the surface 41. Blade 27 and block 15 act like a pair of shears in that one of the blades is a cutting blade and the other blade is a stationary blade which holds the material in place.

Sauer, U.S. Pat. No. 3,308,703 discloses another type of blade comprising a plate for grooving uncured rubber. The blade consists of an outer circumferential edge 13 which is beveled at 13a, 13b and 13c. The bevels are made such that they alternate in opposite directions of slope. Positioned between the teeth 12 are gullets 15. Gullets 15 are formed with side cutting edges 16 and 17. The Sauer device operates on uncured rubber which is a sticky soft material which can have reinforcing material contained within the sticky soft mass. The outer rim of bevel teeth 12 are sharpened to cut into the rubber and create a groove. Advancement of the blade is continued until it reaches the cording or reinforcing material which strengthens the rubber. The sharpened surfaces 16, 17 at the root portions are designed to cut and remove the cording from the groove without removing the remainder of the cording. That is to say that the rubber is grooved as the cording material is cut without disturbing the position of the reinforcing material in the uncured rubber.

Martinu, U.S. Pat. No. 4,133,361 discloses a device for machining and grooving composite material such as cured particle board. The device consists of a conical disk having a series of blades 62, 63 and 64 attached to the conical outward surface and a groove cutting bit 78 is attached at the center of the conical surface for grooving the composite material. This invention is intended to work on cured composite material which is in a hardened state. The device is designed to machine composite material boards such that joints can be formed easily and quickly.

Blake, U.S. Pat. No. 4,766,794 discloses a conventional rotary saw blade having carbide inserts 18 positioned on the outer surface of the cutting teeth. The cutting surfaces of the inserts 18 are provided at different radial positions such that the blade does not bind within the kerf.

SUMMARY OF THE INVENTION

A first embodiment of the present invention is directed to a saw blade which is designed with a cutting element that cuts the desired material but not the surface of the flat supporting medium that carries that material. The saw blade of the present invention is formed with a series of teeth on the outer circumferential rim with each tooth having a cutting element that is positioned radially inwardly from the outer circumferential rim. Each cutting element is formed with outwardly extending side edges that engage the material to be cut. Both side edges of the cutting element are formed on surfaces tapering rearwardly relative to the planar side surfaces of the saw blade. The top surface of the cutting element is formed tapering rearwardly relative to the outer circumferential rim of the saw blade. Formed in the interior and in the center of the saw blade are mounting holes for positioning the blade on a shaft to cause blade rotation.

Cutting of the yieldable material occurs by urging the outer rim of the saw blade into the yieldable material until the cutting element engages the yieldable material. Blade rotation can be caused to occur after the blade is inserted into the yieldable material or can be started prior to blade insertion in the yieldable material. The cutting elements advance through the yieldable material due to their rearwardly tapered surfaces and cutting edges which cause a shearing or cutting action through the yieldable material. When the cut has reached its full depth the outer circumferential rim acts as a smooth disk which rides over the medium which carries the yieldable material. Thus, it can be seen that the outer circumferential rim allows the blade to cut the yieldable material yet ride over the carrier medium without cutting it.

In a second embodiment, a saw blade formed in accordance with the present invention also includes a carbide insert on the outer circumferential rim of the blade. This insert is unsharpened. Thus, it can act to prevent undue wear of the saw blade which would allow the sharpened recessed cutting insert to come into contact with the conveyor belt. The life of the saw blade and the conveyor belt are prolonged by the use of an unsharpened insert on the outer circumferential rim.

Various advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

DETAILED DESCRIPTION OF THE DRAWINGS

Figure 1:
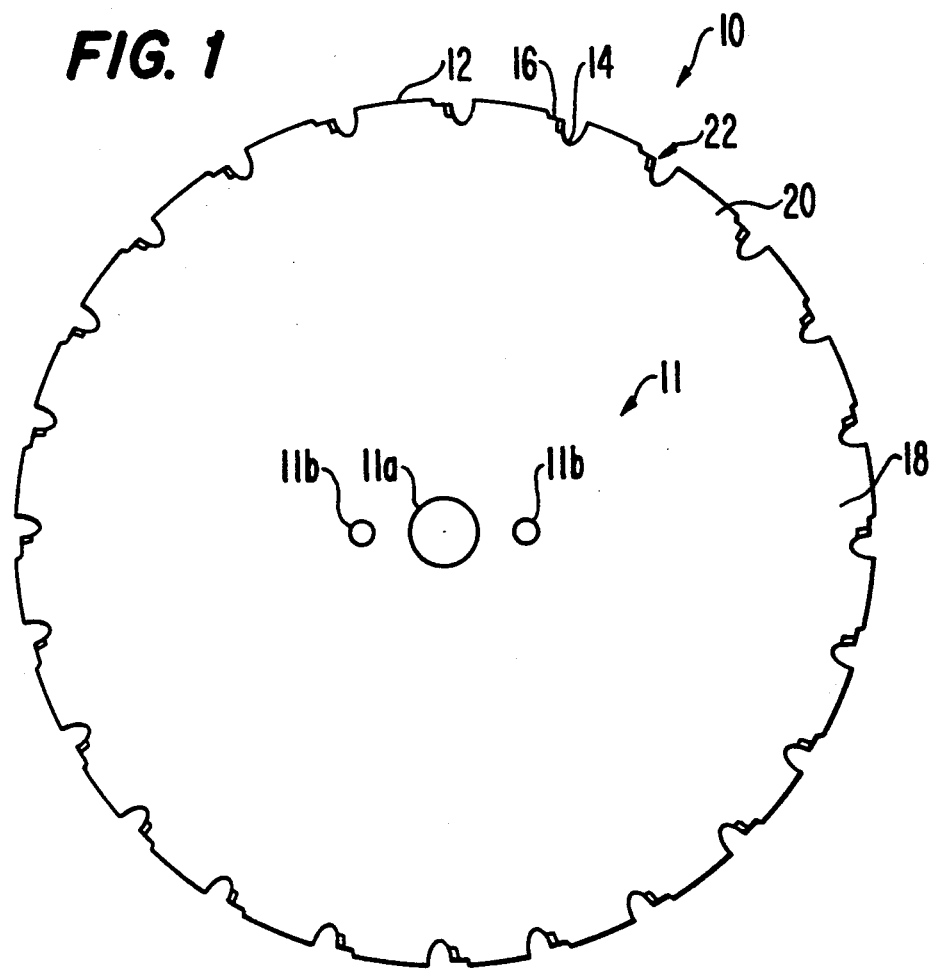
FIG. 1 is a side view of a circular saw blade made in accordance with a first embodiment of the present invention.

Referring to the drawings, wherein like numerals indicate like elements, circular saw blade 10 of the present invention is disclosed. Saw blade 10 comprises a disk which is formed of a metal material such as steel and having parallel planar sides 18. The saw blade is formed with an inner mounting means 11 which includes mounting holes 11a and 11b. Mounting hole 11a is formed at the center of the blade and mounting holes 11b are formed at a distance spaced radially from the center hole and 180 degrees apart. The mounting holes 11a and 11b are designed to cooperate with a mounting structure (not shown) which is part of a device for causing blade rotation such as a motor having a shaft. Blade 10 is formed with a smooth outer circumferential rim 12 having formed therein scalloped portions 14 which define teeth 20, therebetween.

Figure 2:
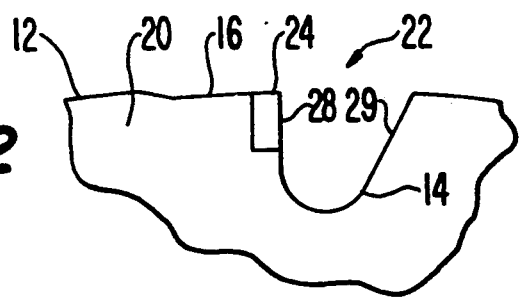
FIG. 2 is a fragmentary side view of a tooth of the saw blade disclosed in FIG. 1.
Figure 3:
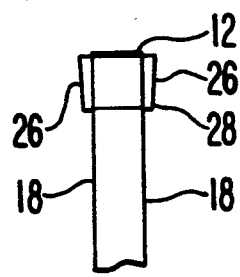
FIG. 3 is a fragmentary front view of the tooth of FIG. 2 viewed rearwardly relative to the direction of rotation and showing the cutting element.
Figure 4:
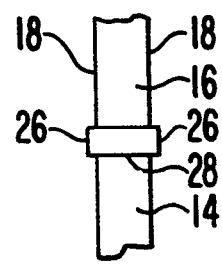
FIG. 4 is a top view of the tooth of FIG. 2.

Referring now to FIG. 2, the outer circumferential rim 12 is also formed with a series of relieved portions or depressions 16 which connect the upper surface 24 of the cutting element 22 to the outer circumferential rim. The top surface 24 of cutting element 22 is formed with a rearward taper which preferably corresponds to the rearward taper of the depression 16. The rearward character of each taper is relative to the direction of rotation of the circular blade. Front face 28 of cutting element 22 is formed perpendicular to a tangent of the outer circumferential rim 12. Thus it can be seen that the surface 24 forms an angle relative to front face 28 of slightly less than 90°.

Cutting element 22 is preferably formed as a carbide insert which is attached to the portion of the tooth that is recessed from the outer circumferential edge. However, cutting element 22 may also be formed of a hardened steel or other type of sharpenable and wear resistant material that is conventional. Cutting element 22 can also be formed integrally with the tooth or as a removable insert that is attached to the tooth 20. Extending outwardly from the planar side surfaces 18 are cutting element surfaces 26 which are formed rearwardly tapering relative to planar side surfaces 18. Tapered side surfaces 26 of cutting element 22 are designed to prevent the blade from being bound within the kerf. Thus, the insert acts as the cutting element and also prevents the blade from binding.

Figure 5:
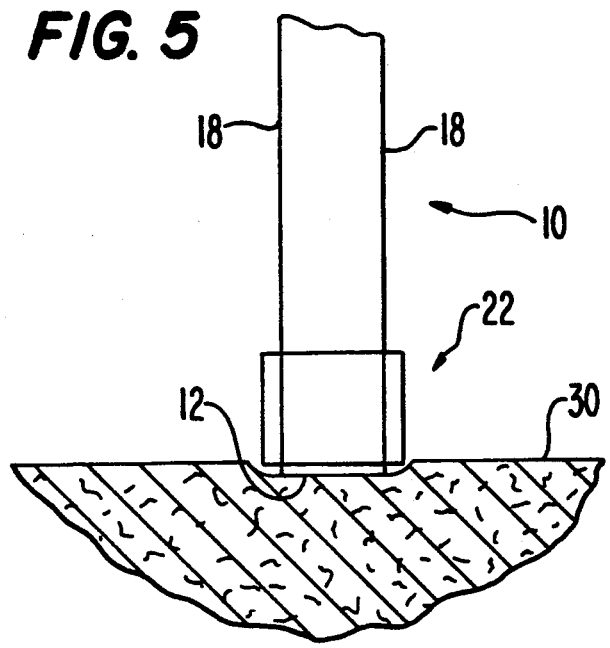
FIG. 5 is a fragmentary view of the saw blade of the present invention similar to FIG. 3 after being pressed into a yieldable material.
Figure 6:
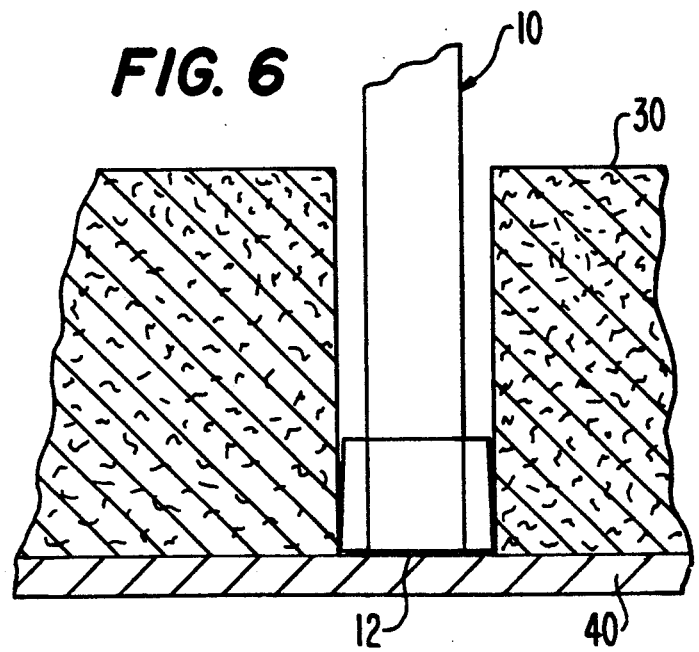
FIG. 6 is a view similar to FIG. 5 showing the saw blade of the present invention after cutting a kerf in the yieldable material.

In operation the blade of the present invention is designed to cut a yieldable material and particularly a loose mat of uncured oriented strand board. This is achieved by causing blade 10 to be advanced radially into the yieldable oriented strand board such that the outer circumferential rim moves into the yieldable material until the cutting teeth 22 engage the yieldable material 30, as shown in FIG. 5. Alternatively, the critical engagement can result from movement of the work into the blade the axis of which remains stationary. The blade can be rotating as it is advancing into the material 30 or caused to rotate after insertion. Cutting teeth 22 are then advanced radially and/or tangentially through the material in a rotary fashion to cut the strand board. When a full depth cut has been achieved, as shown in FIG. 6, the outer circumferential rim 12 acts like a smooth circular disk and rides upon caul or conveyor belt 40 which is carrying the strand board. Thus it can be seen that the saw blade will not cut the conveyor belt or caul which is carrying the material since the blade does not have a sharpened outer edge.

As a specific example, and 18 inch diameter saw blade is designed to have a center mounting hole 11a of one and 17/16 inch diameter and corresponding side mounting holes of 19/32 inch diameter. The blade thickness is approximately 0.1375 inches. The scalloped portions 14 define an angle of 24° between the front face 28 of one adjoining tooth 20 and the rear face 29 of the other adjoining tooth 20. The circumferential length of scalloped portion 14 is approximately 0.460 inches and the length of depressions 16 on tooth 20 is approximately 0.400 inches. The cutting elements are recessed from outer circumferential rim 12 by 0.015 inches and their side edges extend outwardly 0.035 inches from planar side surfaces 18. All tapers on cutting element 22 are approximately 3° relative to either a tangent to the outer circumferential rim or planar side surfaces 18 respectively.

Figure 7:
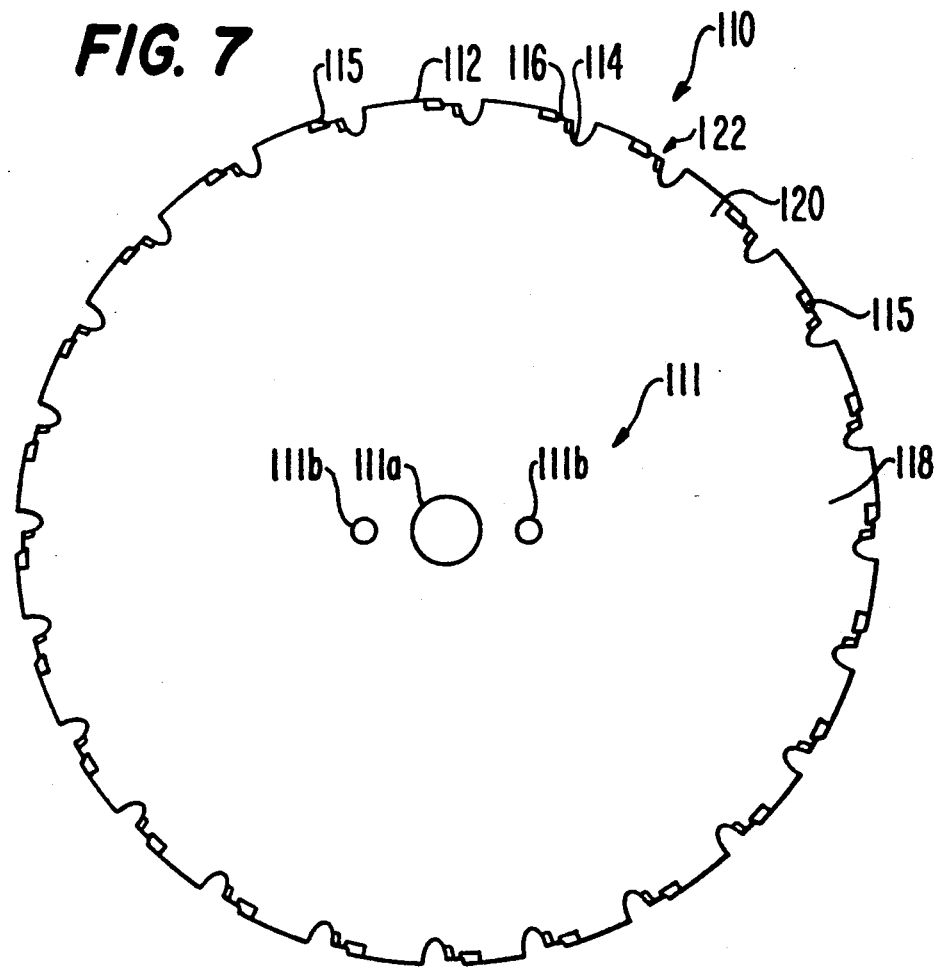
FIG. 7 is a side view of a circular saw blade made in accordance with a second embodiment of the present invention.

FIG. 7 discloses a second embodiment of the present invention. This embodiment is similar to the first embodiment; therefore, like elements are similarly numbered in the one hundreds. For example, in the first embodiment, 10 refers to the saw blade and in the second embodiment 110 refers to the saw blade.

Figure 8:
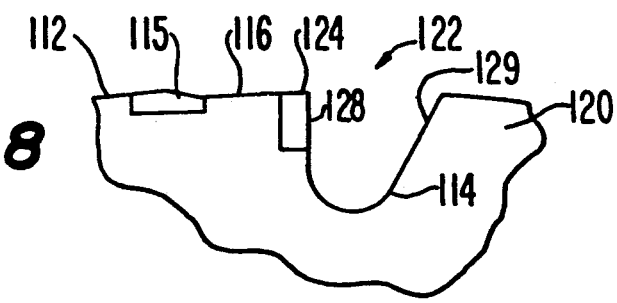
FIG. 8 is a fragmentary side view of a tooth of the saw blade disclosed in FIG. 7.
Figure 9:
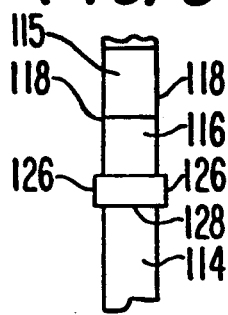
FIG. 9 is a top view of the tooth of FIG. 8.

Referring to FIGS. 7-9, saw blade 110 is formed of a material such as steel and has planar sides 118. Mounting means 111 includes center mounting hole 111a and mounting holes 111b. Outer circumferential rim 112 is formed with scalloped portions 114 which define teeth 120. Depressions or relieved portions 116 are spaced inwardly from outer circumferential rim 112. Depressions 116 are adjacent outer circumferential rim 112. Positioned adjacent depression 116 on each tooth is a cutting element 122 which is similar to cutting element 22. Depression 116 causes cutting element 122 to be spaced inwardly from outer circumferential rim 112. Thus, inwardly spaced cutting element 122 is prevented from contacting the conveyor or caul which carries the material to be cut.

Positioned within depression 116 and extending rearwardly and radially outwardly therefrom to the outer circumferential rim 112 is insert or wear strip 115. In a preferred embodiment, insert 115 is a carbide insert; however, insert 115 can be made of other similar wear resistant materials. Further, in the preferred embodiment, wear strip 115 is designed to extend 0.015 of an inch above the outer circumferential rim to also prevent wear of the rim. Insert 115 need not be a separate piece but can be formed integrally with saw blade 110 and specially treated to a wear resistant character. Hardened steel can be used instead of carbide particularly where the insert is integrally with the blade. Insert 115 contains no sharp edges so that insert 115 will not cut the conveyor or caul that carries the yieldable material.

In use, saw blade 110 is caused to rotate and contact a conveyor or caul in order to completely cut through the yieldable material. This contact causes outer circumferential rim 112 to be worn down if insert 115 is not present. Without the insert, rim 112 can be worn down until cutting element 122 is even with the rim, thus allowing cutting element 122 to cut the conveyor or caul. The second embodiment lengthens the life of the conveyor or caul by preventing a saw blade outer circumferential rim from wearing to the point where the cutting elements cut the conveyor caul. Additionally, the wear strips also lengthen the life of the saw blade which without the wear strips would have to be replaced before the rim is worn to the depth of the cutting elements.

The invention has been described in detail in the foregoing description with reference to the accompanying drawings. However, the disclosure is illustrative only and the invention is not limited to the precise embodiment illustrated. Various changes and modifications may be made therein by one skilled in the art without departing from the scope or spirit of the invention as defined by the appended claims.

What is claimed is:

1. A method of cutting a yieldable material supported by a flat supporting surface with a circular saw blade rotatable about an axis, said saw blade having a generally smooth non-cutting outer circumferential rim which is free of cutting surfaces and planar side surfaces which are perpendicular to the axis of rotation, said saw blade including a plurality of teeth spaced inwardly from said non-cutting outer circumferential rim, with a cutting element positioned on each of said teeth, said cutting elements having a radially outer surface spaced inwardly from said rim and side cutting surfaces that extend axially outwardly from said planar side surfaces, comprising the steps of:
    pushing said saw blade radially into said yieldable material until said cutting elements engage said yieldable material;
    rotating said saw blade such that said side cutting surfaces of said cutting element cut into said yieldable material; and
    advancing said saw blade radially through said yieldable material so that said rim contacts said supporting surface in non-cutting relationship.

2. A saw blade for cutting yieldable material resting on a supporting surface without damaging the supporting surface which comprises:
    a circular plate member having a non-cutting outer circumferential rim, planar side surfaces and mounting means to connect said plate member to drive means for rotating said saw blade about a central axis;
    said plate member having a plurality of scalloped recesses spaced circumferentially around said rim to define therebetween a plurality of teeth having radially outer non-cutting circumferential surfaces spaced around and defining said non-cutting circumferential rim;
    each of said teeth having a cutting element with a radially outer surface spaced radially inwardly from said rim and generally radial cutting edges protruding axially outwardly from said planar side surfaces so that said non-cutting circumferential rim may be pressed radially into said yieldable material to bring said cutting edges into cutting relationship with said yieldable material until said non-cutting outer circumferential rim engages but does not cut the supporting surface.

3. The saw blade as recited in claim 2 wherein each of said teeth includes a forward surface on which said cutting element is positioned and a rearward surface, said forward surface being a leading surface when said saw blade is rotated.

4. The saw blade as recited in claim 3 wherein said outer surface of each said cutting element is tapered rearwardly and radially inwardly and joins said saw blade such as to form a depression spaced radially inwardly from said non-cutting outer circumferential rim.

5. The saw blade as recited in claim 4 wherein side surfaces of said cutting elements are rearwardly and axially inwardly tapered.

6. The saw blade as recited in claim 3 wherein side surfaces of said cutting elements are tapered rearwardly and axially inwardly.

7. The saw blade as recited in claim 3 wherein said cutting elements are formed by carbide inserts.

8. The saw blade as recited in claim 7 wherein side surfaces of said cutting element are rearwardly and axially inwardly tapered.

9. The saw blade as recited in claim 7 wherein said outer surface of each said cutting element is tapered rearwardly and radially inwardly and joins an outer surface on said saw blade spaced radially inwardly from said non-cutting outer circumferential rim.

10. The saw blade as recited in claim 9 wherein side surfaces of said cutting elements are rearwardly and axially inwardly tapered.

11. In a saw blade for cutting a yieldable material resting on a supporting surface, said saw blade having at least one tooth, each said tooth comprising:
    a body portion having planar side surfaces and a smooth non-cutting outer rim that is free of any cutting edges so as not to damage said supporting surface when the cutting of the yieldable material is completed; and
    a cutting element having radially extending cutting edges protruding axially from said planar side surfaces and a a radially outer surface spaced inwardly from said smooth non-cutting outer rim so that cutting of said yieldable material is accomplished by pressing said smooth non-cutting outer rim into said yieldable material until said cutting element engages said yieldable material.

12. The saw blade as recited in claim 11 wherein each tooth has a forward surface and a rearward surface, said forward surface being a leading surface as said tooth is advanced through said yieldable material.

13. The saw blade as recited in claim 12 wherein said outer surface of said cutting element is tapered rearwardly and inwardly of said smooth non-cutting outer rim.

14. The saw blade as recited in claim 13 wherein side surfaces of said cutting element are rearwardly and inwardly tapered towards said planar side surfaces.

15. The saw blade as recited in claim 14 wherein said cutting element is formed by a carbide insert.

16. The saw blade as recited in claim 13 wherein said cutting element is formed by a carbide insert.

17. The saw blade as recited in claim 12 wherein side surfaces of said cutting element are rearwardly and inwardly tapered towards said planar side surfaces.

18. The saw blade as recited in claim 17 wherein said cutting element is formed by a carbide insert.

19. The saw blade as recited in claim 12 wherein said cutting element is formed by a carbide insert.

20. A saw blade for cutting yieldable material resting on a supporting surface without damaging the supporting surface which comprises:

a circular plate member having a non-cutting outer circumferential rim, planar side surfaces and mounting means to connect said plate member to drive means for rotating said saw blade about a central axis;

said plate member having a plurality of scalloped recesses spaced circumferentially around said rim to define therebetween a plurality of teeth having radially outer non-cutting circumferential surfaces spaced around and defining said non-cutting circumferential rim;

each of said teeth having a forward leading surface, a rearward trailing surface and a cutting element on said leading surface, said cutting element having a radially outer surface spaced radially inwardly from said rim and generally radial cutting edges protruding axially outwardly from said planar side surfaces so that said non-cutting circumferential rim may be pressed radially into said yieldable material to bring said cutting edges into cutting relationship with said yieldable material until said non-cutting outer circumferential rim engages but does not cut the supporting surface, each of said teeth having a hardened wear strip defining at least a portion of its outer non-cutting circumferential surface to maintain said cutting elements radially spaced inwardly therefrom.

21. The saw blade as recited in claim 20 wherein said wear strip is formed as an insert of a carbide material.

22. The saw blade as recited in claim 20 wherein said outer surface of each said cutting element is tapered rearwardly and radially inwardly and joins said saw blade such as to form a depression, spaced radially inwardly from said non-cutting outer circumferential rim.

23. The saw blade as recited in claim 20 wherein side surfaces of said cutting elements are tapered rearwardly and inwardly towards said planar side surfaces.

24. The saw blade as recited in claim 20 wherein said cutting elements are formed by carbide inserts.

* * * * *

UNITED STATES PATENT AND TRADEMARK OFFICE
CERTIFICATE OF CORRECTION

PATENT NO. : 5,129,296
DATED : July 14, 1992
INVENTOR(S) : F. Wayne Bales It is certified that error appears in the above-identified patent and that said Letters Patent is hereby corrected as shown below:

ON THE TITLE PAGE:

The last name of the inventor "Wayne" should be --Bales--.
    In item [75], delete "Bales F. Wayne" and insert --F. Wayne Bales--.

Col. 4, line 35, delete "and" and insert --an--.
    Col. 6, line 61, delete "a" (second occurrence).

Signed and Sealed this

Thirty-first Day of August, 1993

Attest:

BRUCE LEHMAN

*Attesting Officer*     *Commissioner of Patents and Trademarks*